United States Patent [19]

Krug et al.

[11] 4,297,416
[45] Oct. 27, 1981

[54] GOLD ALLOY WIRE FOR JEWELRY CHAINS

[75] Inventors: Hans Krug, Pforzheim; Kurt Heilmann, Eisingen, both of Fed. Rep. of Germany

[73] Assignee: Ferd. Wagner, Pforzheim, Fed. Rep. of Germany

[21] Appl. No.: 48,586

[22] Filed: Jun. 13, 1979

[30] Foreign Application Priority Data

Jul. 4, 1978 [DE] Fed. Rep. of Germany ....... 2829284

[51] Int. Cl.³ .................... B23K 35/22; B23K 35/30; B23K 35/00
[52] U.S. Cl. .................... 428/576; 428/672; 228/56
[58] Field of Search ............ 428/576, 672; 228/56

[56] References Cited

U.S. PATENT DOCUMENTS

| 440,693 | 11/1890 | Burdon | 428/672 |
| 446,618 | 2/1891 | Burdon | 428/672 |
| 1,109,423 | 9/1914 | Kammerer | 428/672 |
| 2,503,564 | 4/1950 | Reeve | 428/576 |
| 3,169,048 | 2/1965 | McGinn | 428/576 |
| 3,494,579 | 2/1970 | Buchanan | 428/672 |

FOREIGN PATENT DOCUMENTS 360261 3/1921 Fed. Rep. of Germany ...... 428/672

*Primary Examiner*—Brooks H. Hunt
*Attorney, Agent, or Firm*—Cushman, Darby & Cushman

[57] ABSTRACT

Gold alloy wire for the production of jewelry, especially jewelry chains, is made of a gold solder containing nucleus and a jacket of a gold alloy wherein the solder containing nucleus has a core of fine gold which is surrounded by a layer of a ductile, lower melting gold solder alloy.

6 Claims, 4 Drawing Figures

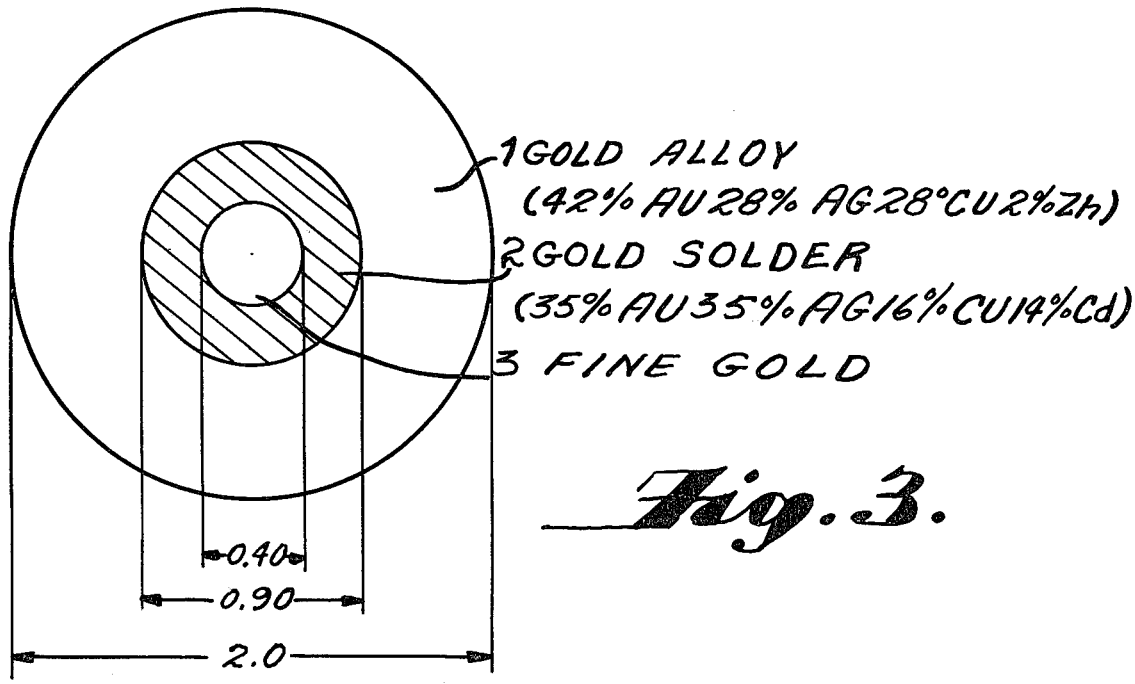
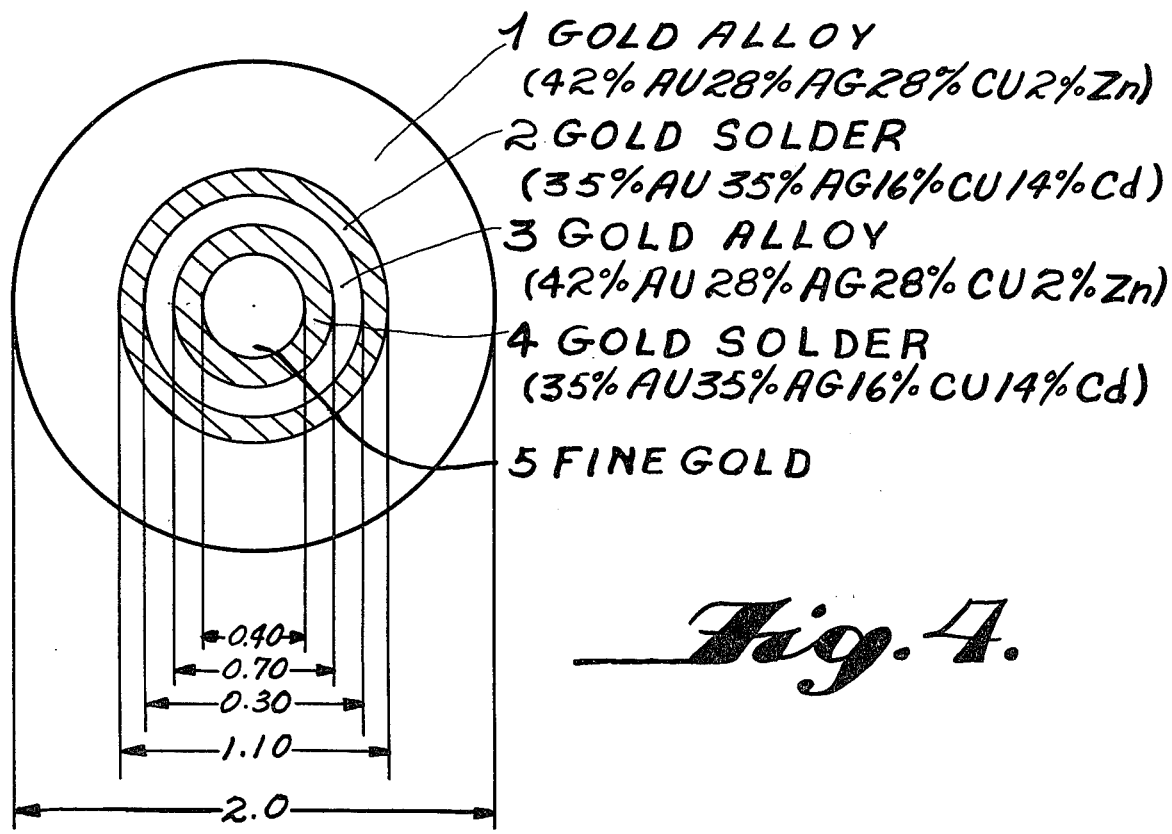

GOLD ALLOY WIRE FOR JEWELRY CHAINS

BACKGROUND OF THE INVENTION

The invention is directed to gold alloy wires for jewelry, especially for jewelry chains which consists of a solder containing nucleus and a jacket of gold alloy.

So-called gold-solder nucleus wires are preferably used for the production of jewelry chains. These gold-solder nucleus wires consist of gold alloys of the desired fineness which contain a nucleus of a lower melting gold alloy. The gold fineness content of the wires for the most part is 8, 9, 14 or 18 carat in various gold colors (white gold, yellow gold, etc., according to the compounds of the alloy). Chains are prepared from these wires on special machines, which chains then are treated with flux materials and talcum powder. Subsequently they are heated in continuous heating oven whereby in the link, i.e., the contact place of two wire ends of each chain member a small amount of solder must be melted in order that there is formed a solder joint of sufficient strength inside each chain member.

In place of solder nucleus wires there are also employed solid wires of gold alloys, likewise in a fineness content of 8, 9, 14 or 18 carat. The working of these wires of jewelry chains is substantially more expensive since a powdery solder must be applied in the narrow links in order that there can be formed a solder joint of sufficient strength between the wire ends of each chain member. These powdery solders are mostly very low melting, non-noble metal containing gold alloys which shift the fineness content of the finished chain member toward lower values. Because of the strict chasing specification this reduction in the fineness content is a great disadvantage.

A greater portion of the jewelry chains are additionally shaped by rolls and are turningly worked with diamond tools (so-called diamonding). It is important thereby that the gold fineness content of the chain not be changed in these additional operations.

With the previously known gold alloy nucleus wires it is a matter of wires which consist of a jacket of a gold alloy which depends on the desired fineness and color and a nucleus of a lower melting gold alloy which serves as solder. The fineness content of this solder nucleus is usually the same as the outer jacket, in individual cases even lower. In order to guarantee a safe solder proportion, the liquidus and solidus temperatures of jacket and nucleus differ about 100° C.

However, many gold alloys with non-noble metal insertions above all with decreasing carat number become increasingly hard and more difficult to shape. Above all from this there results in the previously known gold-solder nucleus wires increased difficulties in manufacture, especially through embrittlement and wire breaks. If gold-solder nucleus wires are manufactured with outer jacket and nucleus of the same carat number, with the provision that for the jacket and nucleus gold alloys are used of good ductility and sufficient difference in liquidus and solidus temperatures there cannot be chosen any colors desired for the gold alloys. Previously there were known only solder nucleus wires with 9 carats, which under these conditions could be produced with defensible operating expense.

Gold-solder nucleus wires are only diamondizable if the solder nucleus has the same fineness as the jacket. If solder nuclei are used of lower fineness then the fineness content of the diamondized jewelry chain is reduced considerably compared to the solder nucleus wire.

The for the most part hard gold solder nucleus wires which for the most part still contain brittle solder nuclei are only limitedly suited for the production of profile wires with for example, rectangular and semicircular cross section. Frequently in these profiles produced by rolling and drawings there are observed wire ruptures and breaks at the edges. Besides the solder nucleus is frequently crushed to irregular shapes.

A further disadvantage of the previously known gold solder nucleus wires is that because of the relatively large portion of solder, which is caused by the manufacturing process, the solder flux is very difficult to influence in the soldering of the chains. Too much solder occurs at the links of individual chain members so that the chain becomes unusable.

Therefore it was the problem of the present invention to create gold alloy wires for jewelry, especially for jewelry chains consisting of gold soler containing nucleus and a gold alloy jacket, which do not have the above described disadvantages, particularly permit any desired selection of fineness and gold color and also are capable of being chased in the diamondization. Besides they should be easily producible and processible.

SUMMARY OF THE INVENTION

This problem was solved by the invention by providing a core of fine gold which is surrounded by a layer of a ductile, low melting gold solder alloy. Advantageously the fine gold core is alternately surrounded by several layers of the ductile gold solder and fine gold.

The gold solder nucleus wires of the invention differ from the known above all in that in place of the hard and for the most part brittle solder nucleus there are employed only ductile compounds. A softer, more ductile nucleus of fine gold is surrounded by a tubular shaped alloy layer of a very ductile and low melting gold alloy. This insertion of nucleus and solder is located within a most highly possible ductile gold jacket of the desired fineness and desired color. The portion of gold solder and fine gold nucleus thereby is advantageously so formulated in surface area that they always correspond to the fineness of the gold jacket or of the wire. As gold solder which is employed in the form of a tube or sheet bent to form a tube there is especially employed an alloy of the following composition.

Gold: 25–55%
Silver: 20–40%
Copper: 20–40%
Zinc: 1–5%

A specific alloy contains gold 42%, silver 28%, copper 28% and zinc 2%.

The cross sectional ratio and the alloy content of the individual gold alloy layers and fine gold layers are advantageously so selected that both the nucleus and the jacket have about the same gold content. Since the alloy layer and the nucleus are of fine gold corresponding to the fineness of the wire, by the heat treatment selected using the diffusion of the alloy elements the solder behavior produced can be influenced. With the soldering of the jewelry chains the originally lower alloyed solder layer alloys with the fine gold of the nucleus and forms a new gold alloy corresponding to the desired total fineness content.

The gold-solder nucleus wires of the invention can be constructed with one layer or also with several intermediate layers of gold solders and fine gold. According to the use intended these gold solder layers can be regulated preponderantly in the inner or average range of the wire cross section. Additionally the nucleus can consists of fine gold whereby the fine gold portions correspond to the desired degree of fineness, but alloyed with consideration of optimum ductility or desired color.

The thickness of the gold alloy insertions advantageous according to the formulation of the degree of fineness are held so small that in the soldered chains there is formed a sufficient adhesion in the links or joints but no excess solder can leave the link or joint.

Through the building up of ductile individual components such as fine gold, ductile gold solder and gold alloy the wires of the invention can be manufactured without the otherwise customary breakage of solder and without surface breaks in the wires or profiles with greater safety and with industrially favorable conditions.

In the rolling of profile wires (rectangular, semicircular shape, etc.) through the very soft nucleus of fine gold the solderable zone adjusts itself better to the shape of the outer contour. Thus excessive wall thickness reduction can be avoided. Therefore the solder nucleus wires of the invention show, depending on the profile, a uniform and sufficient wall strength, above all then, if the solder zone is arranged deep in the center of the wire.

Through the distribution of the relatively large solder surface area with previously known solder nucleus wires in one or more ring shaped zones, an excessive amount of solder in the links of the chains is avoided.

With gold alloy wires of the invention it is possible to produce solder nucleus wire of the same fineness, but of different color with the same solder insert of fine gold nucleus and gold solder. The different gold colors can be produced in a fineness of 8, 9, 14 and 18 carat.

The great advantage of the new solder nucleus wires is that they can be diamonded (i.e. milled away) to any desired depth without shifting the fineness content to low values. Due to the nucleus of fine gold the fineness content of diamonded chains can be increased a trifling amount if the fineness of the fine gold nucleus and gold solder is established somewhat higher than the desired fineness of the gold jacket or the gold solder nucleus wire. Diamonded jewelry chains from these wires therefore fulfill all requirements which are retained in the chasing.

BRIEF DESCRIPTION OF THE DRAWINGS

FIG. 3 is a schematic illustration of one form of the gold solder wire of the invention showing the cross-sectional ratio in millimeters and composition of the individual layers of the chain.

FIG. 4 is a schematic illustration of another form of the gold solder wire of the invention showing the cross-sectional ratio in millimeters and composition of the individual layers of the chain.

Unless otherwise indicated all parts and percentages are by weights.

The jewelry chains can consist essentially of or consist of the materials set forth.

DESCRIPTION OF THE PREFERRED EMBODIMENTS

Figure 1:
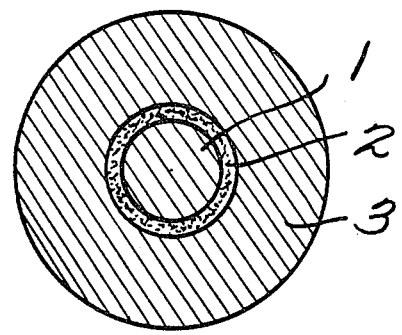
FIG. 1 is a schematic illustration of one form of the gold-solder chain of the invention.

Referring more specifically to FIG. 1 the gold-solder nucleus wire consists of a fine gold core 1 which is surrounded by a gold-solder layer 2 and an outer gold alloy jacket 3.

Figure 2:
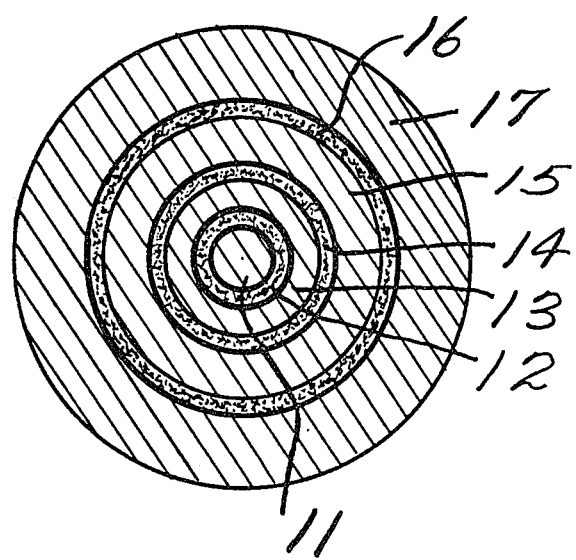
FIG. 2 is a schematic illustration of another form of gold-solder chain according to the invention.

As shown in FIG. 2 the wire consists of a fine gold core 11 which is surrounded alternately by several gold alloy layers 12, 14 and 16 and fine gold layers 13 and 15 and an outer gold alloy jacket 17.

As shown in FIG. 3 the gold alloy 1 consists of 42% gold, 28% silver, 28copper and 2% zinc, the gold solder 2 consists of 55% gold, 35% silver, 16% copper and 14% cadmium and inner layer 3 is of fine gold.

As shown in FIG. 4 the gold alloy 1 consists of 42% gold, 28% silver, 28% copper and 2% zinc, the gold solder 2 consists of 35% gold, 35% silver, 16% copper and 14% cadmium, the gold alloy 3 consists of 24% gold, 28% silver, 28% copper and 2% zinc, the gold solder 4 consists of 35% gold, 35% silver, 16% copper and 14% cadmium and inner layer 5 is of fine gold.

There is hereby incorporated by reference the entire disclosure of the German priority application No. P 28 29 284.4.

We claim:

1. In a gold alloy wire suitable for the production of jewelry, especially jewelry chains consisting essentially of a gold solder containing nucleus and a jacket of gold alloy the improvement comprising said solder containing nucleus having a core of fine gold surrounded by an ajacent layer of ductile, lower melting gold solder alloy.

2. A wire according to claim 1 wherein the gold-solder alloy contains 25–55% gold, 20–40% silver, 20–40% copper and 1–5% of zinc.

3. A wire according to claim 1 wherein the fine gold core is surrounded by a plurality of alternating layers of (1) ductile gold and (2) gold solder alloy, the first layer being a ductile gold layer and the final jacket layer being a gold alloy.

4. A wire according to claim 3 wherein the gold solder alloy contains 25–55% gold, 20–40% silver, 20–40% copper and 1–5% of zinc.

5. A wire according to claim 4 wherein the cross-section ratio and composition of the individual layers of the solder containing nucleus are such that the nucleus and jacket contain about the same amount of gold.

6. A wire according to claim 1 wherein the cross-section ratio and composition of the individual layers of the solder containing nucleus are such that the nucleus and jacket contain about the same amount of gold.

* * * * *